UNITED STATES PATENT OFFICE.

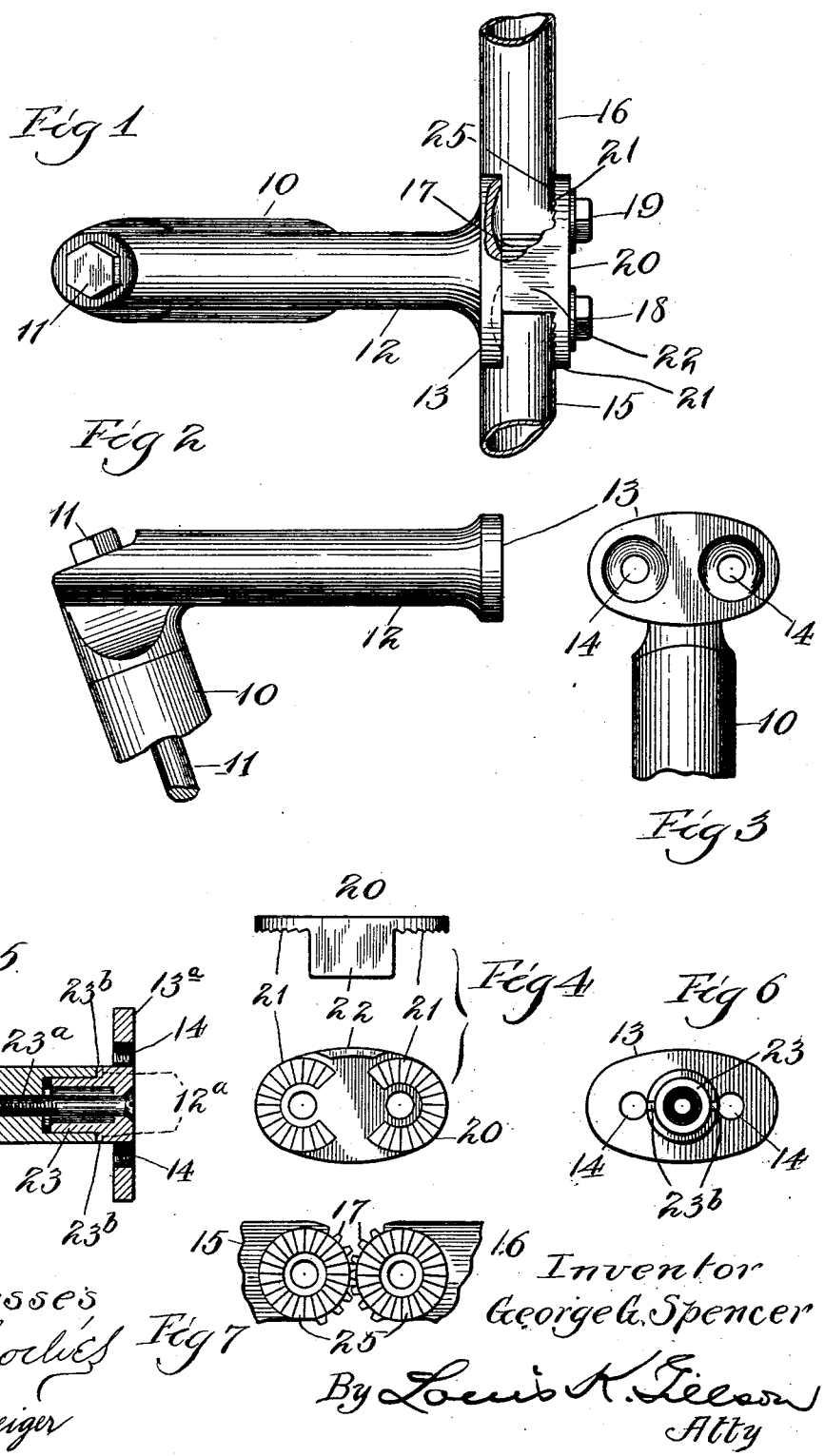

GEORGE G. SPENCER, OF CHICAGO, ILLINOIS, ASSIGNOR TO THE CHICAGO HANDLE BAR CO., OF ILLINOIS.

STEERING DEVICE FOR BICYCLES.

SPECIFICATION forming part of Letters Patent No. 677,428, dated July 2, 1901.

Application filed April 28, 1900. Serial No. 14,701. (No model.)

*To all whom it may concern:*

Be it known that I, GEORGE G. SPENCER, a citizen of the United States, and a resident of Chicago, county of Cook, and State of Illinois, have invented certain new and useful Improvements in Steering Devices for Bicycles, of which the following is a specification, and which are illustrated in the accompanying drawings, forming a part thereof.

The invention relates to the combination of a divided handle-bar having its members vertically adjustable with an extension head or support; and its object is to provide a construction in which the members of a divided handle-bar may be so mounted at the forward end of an arm projecting from the steering-head that they may be raised and lowered in unison and may be rigidly locked in the position to which they may be adjusted.

The invention consists in the parts and arrangement of parts, as hereinafter fully described and as illustrated in the accompanying drawings, in which—

Figure 1 is a detail plan of the steering device. Fig. 2 is a detail side elevation of the stem and its projecting arm. Fig. 3 is a detail front elevation of the same. Fig. 4 includes a plan and rear elevation of a binding-plate used in the device. Fig. 5 is a detail longitudinal section on the extension-arm, showing a slight modification of construction. Fig. 6 is a rear view of the plate forming a part of the extension-arm as shown in Fig. 5, and Fig. 7 is a detail side elevation of the two members of the handle-bar.

The stem 10 is adapted to telescopically enter the steering-head of a bicycle and is provided with the expander-rod 11, commonly used in securing the stem within the head. An arm 12 projects forwardly from the upper end of the stem 10 and is provided at its front end with an oblong plate 13, which may be formed as an integral part of the arm or may be a separate member, as shown at 13ª, provided with a stem 23, adapted to enter a suitable aperture entering the end of the arm. When the latter construction is followed, the parts are secured together by a screw 23ª, entering through the plate 13ª and its stem into the stem 12, and one of the parts is provided with a lug or with lugs, as 23ᵇ, adapted to enter corresponding recesses, as 12ª, in the other member. As shown, Figs. 5 and 6, the lugs are formed on the stem 23 and the recesses in the stem 12.

The plate 13 is provided with two bolt-holes 14 14, one near each of its ends, and the two members 15 and 16 of the divided handle-bar are pivotally secured against the plate 13 by means of the bolts 18 and 19, threaded to engage the apertures 14. The bolt-holes are preferably countersunk in concave form, as shown, and the coöperating disk faces of the hubs of the handle-bar members 15 and 16 are given a corresponding convex form, as shown in Fig. 1.

The inner or adjacent ends or hubs of the handle-bar sections 15 16 are provided with intermeshing gear-teeth, as shown at 17, so that the two handle-bar sections will always move in unison. A binding-plate 20 of substantially the same form as the plate 13 is applied to the outer disk faces of the hubs of the handle-bar sections and is held in place by the bolts 18 19, which pass through it. The inner surface of this plate is provided with two sets of annularly-arranged serrations 21 21, radiating from the bolt-holes, and these serrations coöperate with similar serrations 25, formed upon the outer faces of the hubs of the handle-bar sections. The plate 20 may be provided with a flange 22, projecting inwardly from its upper edge, so as to in part cover the gear-teeth 17.

The handle-bars are adjusted to any desired position by first turning back the bolts 18 19, and as they are geared together the adjustment of the two members is always uniform, and when these members are in the desired position they are locked in place by turning up the bolts 18 and 19.

I claim as my invention—

In a steering device for bicycles, in combination, a stem having a forwardly-projecting arm, an elongated plate at the end of such arm, the plane of the plate being transverse to the axis of the arm, a handle-bar of two sections separately pivoted to the plate, the hubs of the handle-bar sections having intermeshing gear-teeth, a single binding-plate lying against the outer faces of such hubs, the pivots of the handle-bar sections passing through the binding-plate and being threaded into the first-mentioned plate.

GEORGE G. SPENCER.

Witnesses:
PAUL CARPENTER,
LOUIS K. GILLSON.